US006295844B1

(12) United States Patent
Tran et al.

(10) Patent No.: US 6,295,844 B1
(45) Date of Patent: Oct. 2, 2001

(54) APPARATUS AND METHOD FOR DRAWING GLASS FIBERS

(76) Inventors: Danh C. Tran, 607 Watts Branch Pkwy., Rockville, MD (US) 20854; Pablo C. Pureza, 6120 Mantle Rd., Burke, VA (US) 22015

( * ) Notice: Subject to any disclaimer, the term of this patent is extended or adjusted under 35 U.S.C. 154(b) by 0 days.

(21) Appl. No.: 07/415,923

(22) Filed: Sep. 11, 1989

Related U.S. Application Data

(63) Continuation of application No. 07/120,189, filed on Oct. 16, 1987, now abandoned, which is a continuation of application No. 06/534,926, filed on Sep. 22, 1983, now abandoned.

(51) Int. Cl.[7] .......................... C03B 37/025; C03B 37/03

(52) U.S. Cl. ................................ 65/537; 65/280; 65/356; 65/477; 65/535

(58) Field of Search .................................. 65/2, 10.1, 12, 65/13, 280, 356, 477, 535, 537

(56) References Cited

U.S. PATENT DOCUMENTS

| | | | | |
|---|---|---|---|---|
| 3,076,324 | * | 2/1963 | Morgan | 65/10.1 X |
| 3,362,803 | * | 1/1968 | Dannohl et al. | 65/13 |
| 3,890,127 | * | 6/1975 | Siegmund | 65/12 |
| 4,030,901 | * | 6/1977 | Kaiser | 65/2 |
| 4,202,679 | * | 5/1980 | Cocito | 65/2 |
| 4,249,925 | * | 2/1981 | Kawashima et al. | 65/13 X |
| 4,259,100 | * | 3/1981 | Aulich et al. | 65/121 X |
| 4,263,030 | * | 4/1981 | Kobayashi et al. | 65/2 |

FOREIGN PATENT DOCUMENTS

| | | | | |
|---|---|---|---|---|
| 0134721 | * | 10/1979 | (JP) | 65/2 |

OTHER PUBLICATIONS

Tran et al. "Fluoride Glass Preforms Prepared By A Rotational Casting Process", *Electronics Letters,* Jul. 22, 1982, vol. 18, No. 15, pp. 657–658.*

Tran et al. "Fluorozirconate Glasses With Improved Viscosity Behavior For Fiber Drawing", *Mat. Res. Bull.,* vol. 17, pp. 1177–1184, 1982.*

Cannon, "Optical Fibre Materials For Operating Wavelengths Longer Than 2 $\mu$m", *Journal of Non–Crystalline Solids,* 42 (1980) 239–246.*

Tran et al. "Rayleigh Scattering in $Z_rF_4$–Based Glasses", *Electron Lett.* vol. 18, No. 24, pp. 1046–1048, 1982.*

Gbogi et al. "Surface and Bulk–OH Infrared Absorption in $ZrF_4$–and $HlF_4$–Based Glasses", *Communications of the American Ceramic Society,* Mar. 1981, pp. C–51–C–53.*

Tran et al. "Fluoride Glass Preforms Prepared By A Rotational Casting Process" Electronics Letters, Jul. 22, 1982, vol. 18, No. 15, pp. 657–658.

Tran et al. "Fluorozircomate Glasses With Improved Viscosity Behavior For Fiber Drawing" Mat. Res. Bull., vol. 17, pp. 1177–1184, 1982.

Cannon "Optical Fibre Materials For Operating Wavelengths Longer Than 2 um" Journal of Non–Crystalline Solids 42 (1980) 239–246.

Tran et al. "Rayleigh Scattering In Zr $F_4$–Based Glasses" Electron Lett. vol. 18, No. 24, pp. 1046–1048, 1982.

Gbogi et al. "Surface and Bulk–OH Infrared Absorption In $ZrF_4$–and $HfF_4$–Based Glasses" Communications of the American Ceramic Society, Mar. 1981, pp. C–51–C–53.

* cited by examiner

*Primary Examiner*—Richard D. Lovering

(57) ABSTRACT

An apparatus and method for drawing low loss fluoride glass fibers from a preform. A stream of reactive gas is passed around the preform and fiber so as to prevent moisture and oxygen contamination of the fiber while the fiber is being drawn. The apparatus includes an insulating vessel which surrounds a heating chamber in which the fiber is drawn, and a very narrow heating zone within the chamber for preventing crystallization of the drawn fiber.

8 Claims, 1 Drawing Sheet

APPARATUS AND METHOD FOR DRAWING GLASS FIBERS

This application is a continuation of Ser. No, 07/120,189, filed Oct. 6, 1987 and now abandoned, which is a continuation of Ser. No. 06/534,926, filed Sep. 22, 1983 and now abandoned.

BACKGROUND OF THE INVENTION

This invention relates to glass fiber making and particularly to the type of fiber making in which a glass optical fiber is drawn from a preform.

Optical fibers are customarily drawn by feeding a glass preform longitudinally into a heating chamber, wherein one end of the preform is heated in a heating zone causing the preform to soften and begin to flow by gravity, thereby forming a fiber. The fiber is then drawn from the preform.

One of the most important considerations in the drawing of optical fibers is the total optical loss of the drawn fiber. In long distance communication systems, for example, a low loss characteristic (for example less than about 0.1 dB/km) is essential. Absorption and scattering losses, both intrinsic and extrinsic, contribute to the total optical loss in a glass fiber. In respect to intrinsic loss, intrinsic scattering loss results from density fluctuations in the glass, and intrinsic absorption loss arises from the glass multi-phonon structural vibration.

Fluoride glasses have been found theoretically to have an ultra low intrinsic optical loss, about 0.001 dB/km at a wavelength of 3.6 $\mu$m. Therefore, fluoride glass has much potential as a material for use in low loss optical fibers suitable for long range communication systems. However, fluoride glass is very unstable and is susceptible to moisture attack, thus forming OH and O groups upon heating the glass to the fiber drawing temperature. The hydroxyl groups are a source of unwanted extrinsic absorption loss at wavelengths of about 2.8 $\mu$m, whereas oxygen causes absorption of light at a wavelength of approximately 7.3 $\mu$m.

In addition to the loss due to contamination by moisture and oxygen, loss can also result when the glass is exposed to the drawing temperature for an extended period of time or to a non-uniform drawing temperature, conditions causing phase separation and microcrystallization. Such crystallization in the fluoride glass causes scattering loss.

Prior methods of making fluoride optical fibers have not been capable of producing fluoride glass fibers having low loss characteristics, primarily because of crystallization of the glass from extended heating, fluctuations in drawing temperature, and glass contamination by impurities such as moisture and oxygen.

Typically in prior techniques, the crucibles or preform from which the fiber is drawn are flushed with an inert gas such as argon, as shown in FIG. 5 of "Fluorozirconate Glasses with Improved Viscosity Behavior for Fiber Drawing" by D. C. Tran, Ginther, and Sigel, *Materials Research Bulletin,* Vol. 17, No. 9 (1982), incorporated herein by reference. This inert gas serves only to purge the heating chamber of impurities such as moisture, oxygen, dust, transition metals, etc. Any contaminants which reach the surface of the glass remain in the glass, thereby causing undesirable optical loss in the finished fiber. In addition, prior drawing devices have heating zones, in which the preform is softened and drawn, which are too long, such that crystallization of the glass results. Finally, prior devices also do not provide adequate temperature stability for fluoride fiber drawing within the heating chamber, which also results in crystallization. As discussed, such crystallization in the finished fluoride fiber causes unwanted scattering loss.

SUMMARY OF THE INVENTION

Therefore, it is an object of this invention to provide an apparatus and method for drawing fluoride glass optical fibers wherein contamination of the drawn fiber is minimized such that a drawn fluoride fiber has a low optical loss.

It is another object of this invention to provide a fiber drawing apparatus having a heating chamber with a narrow heat zone and temperature stability so that crystallization of the drawn fiber may be minimized.

Various other objects and advantages will appear from the following description of one embodiment of the invention, and the novel features will be particularly pointed out hereinafter in connection with the appended claims.

The above and other objects are achieved by several features. First, the preform and fiber are flushed with a reactive gas which reacts with the fluoride glass to remove moisture from the preform surface and prevent O contamination. The gas also acts to purge the heating chamber of contaminants. To maintain temperature stability within the heating chamber wherein the fiber is drawn, an enclosure similar to a bell jar is provided for preventing convection currents which cause temperature fluctuations. Insulation around the heating chamber also contributes to temperature stability. In addition, a short heating zone of about 2 mm is provided by an induction furnace. Thus, the above features of the invention act to prevent contamination and crystallization of the glass fiber being drawn, such that a low loss fiber may be produced.

DESCRIPTION OF THE PREFERRED EMBODIMENTS

Figure 1:
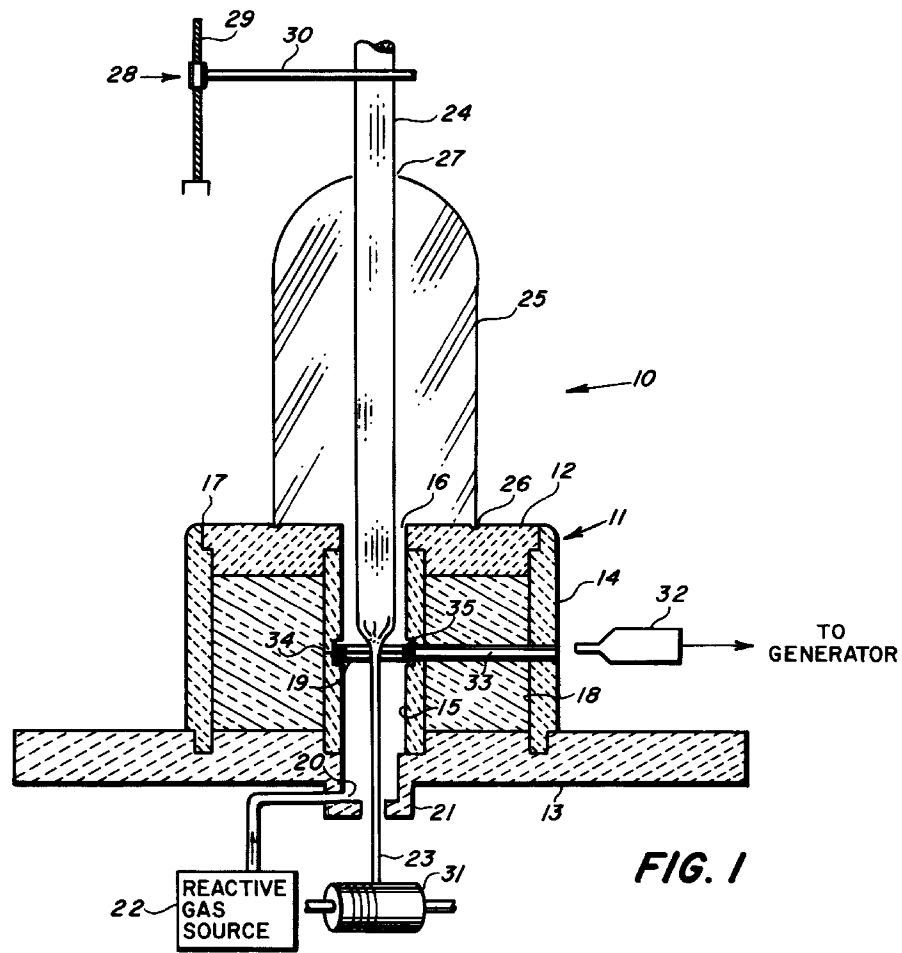
FIG. 1 is a cross-sectional view of a preferred embodiment of the apparatus for drawing glass fibers.

In FIG. 1 there is illustrated one embodiment of an apparatus for drawing fluoride glass fibers having low optical loss. As shown, furnace 10 includes an insulating vessel 11, which comprises a top wall 12, a bottom wall 13, an outer side wall 14, and an inner side wall 15, wherein the innermost surface of the inner side wall 15 defines a passageway or heating chamber 16. The inner side wall 15 is preferably formed from two halves, joined at joint 34 with cement. Alternatively, the two halves could simply be held together mechanically by clamping the wall 15 between top wall 12 and bottom wall 13 with some connecting means such as bolts connecting the top wall 12 with bottom wall 13. The above mentioned walls, all of which may be, by way of example, of a high density alumina such as Morganite, are joined together at joints such as shown at 17 by means of, for example, a heat resistant glue such as Sauereisen cement. A cavity is formed within the vessel 11 which is filled with a fibrous insulating material 18, for example Fiberglas, which assists in maintaining a constant temperature within the heating chamber 16.

Mounted within the heating chamber 16 is a heating coil 19, as shown in the embodiment of FIG. 1 as being of the induction type. Alternatively, a resistance coil could be utilized to heat chamber 16. A typical resistance coil comprises simply a coil of wire heated by a source of electrical energy (not shown). Such resistance heating, however, is not as localized as induction heating. Therefore, the heating zone within the chamber is longer (as measured along the longitudinal axis of the heating chamber) than the zone obtained with induction heating. Here, the term "heating zone" in the context of fiber drawing can be defined as the zone within the heating chamber wherein the temperature is such that a fiber can be drawn from the preform. In the drawing of most fluoride fibers, the narrowest obtainable heating zone with resistance heating is about 7 mm. Such a heating zone causes some crystallization in the fluoride glass, thereby causing scattering loss in the drawn optical fiber. As discussed below, the use of an induction coil overcomes these problems to a great degree, so that an induction coil is preferred.

Coil 19 is connected to an RF frequency generator (not shown) which produces a frequency of about 450 KHz. An RF field is generated by coil 19 which causes heat to be generated in susceptor 35, which is shown as being mounted in close proximity to coil 19. The maximum temperature within the chamber 16 is preferably 200° C.–550° C. The susceptor 35 may comprise by way of example, a single relatively flat copper loop coated with a protective coating such as gold, mounted as shown so as to surround an inserted preform. The gold coating is provided to protect the copper loop from attack by reactive gases in the chamber 16. Typically, the loop has a thickness of about 1 mm, and a cross sectional width of about 10 mm to 20 mm. In contrast to resistance heating, which requires multiple loops to achieve the drawing temperature so as to produce a 7 mm heating zone, the single loop susceptor 35 produces a narrow heating zone of only about 2 mm in length in drawing a $ZrF_4$ based preform (measured along the longitudinal axis of the heating chamber). Consequently, crystallization in a fiber drawn in such a narrow 2 mm zone is almost completely suppressed. An induction coil and RF generator like that described are commercially available from Lepel Corporation.

A pyrometer 32 is also provided to monitor the temperature within the chamber 16 such that its output is fed into the RF frequency generator in a conventional feedback arrangement. The generator is thereby automatically adjusted to compensate for any temperature changes detected by pyrometer 32, so that temperature fluctuation within the chamber 16 is kept to a minimum. As is known to those skilled in the art, the pyrometer 32 monitors temperature by detecting infrared radiation transmitted through sight tube 33 producing an electrical signal proportional to the infrared radiation detected. A conventional pyrometer may be employed, adapted for operation in the 250°–600° range. Such a pyrometer is commercially available from Ircon Corporation.

Where resistance heating is employed a thermocouple may be provided for monitoring the temperature of the chamber 16 and providing feedback in a conventional manner to the power supply (not shown), such as a Eurotherm 984 controller. The chamber temperature is allowed to fluctuate only ±0.5° C. The thermocouple must be mounted so as to be in contact with the inner side wall.

A reactive gas inlet 20 is provided in an iris 21 through which the fiber is drawn. Reactive gas source 22, having conventional flow controls, projects a stream of reactive gas at a flow rate of about 0.1–1 ft$^3$/min. around the fiber 23 and preform 24 so as to flush the preform and fiber with the reactive gas. The reactive gas has two effects which serve to prevent contamination of the preform 24 and fiber 23. First, the stream of gas flowing through the chamber 16 physically purges the chamber of contaminants such as water, air, dust, and various light absorbing transition metals which may contaminate the softened preform 24. Second, the reactive gas also acts to chemically react with the fluoride glass surface to remove hydroxyl groups (—OH) and oxygen, or to react with adsorbed $H_2O$ so as to remove it from the surface. Such hydroxyl groups and oxygen derive from water and air which have entered the heating chamber 16 and reacted with the fluoride glass. As discussed above, the water and oxygen chemically combined with the fluoride glass act to absorb certain wavelengths of light and therefore contribute to the optical loss of the drawn optical fiber. In addition, crystallization can be avoided by preventing moisture and oxygen contamination by the purging or elimination from the chamber of moisture and oxygen by the stream of reactive gas.

Suitable reactive gases which will react with fluoride glass to remove adsorbed $H_2O$ hydroxyl groups, and oxygen are: sulfur hexafluoride ($SF_6$), chlorine gas ($CL_2$), fluorine gas ($F_2$), hydrogen fluoride (HF), hydrogen chloride (HCl), hydrogen bromide (HBr), carbon tetrachloride ($CCl_4$), and carbon tetrafluoride ($CF_4$). Possible reactive gases are not limited to those above. Any reactive gas which reacts with fluoride glass to remove —OH, oxygen, or $H_2O$ from the surface can be used to flush the preform or fiber.

As an example, the reaction of HF with a $ZrF_4$ based glass which also includes $BaF_2$ will be considered. If the preform 24 or fiber 23 are exposed to water in the heating chamber 16, the water will react with the glass so that, upon heating, a fluorine in a $ZrF_4$ molecule will be replaced with —OH yielding $ZrF_3$—OH, and a fluorine of a $BaF_2$ molecule will be replaced by oxygen. When the surface of the glass is exposed to HF, the following reaction takes place:

$$ZrF_3\text{—}OH+HF\rightarrow ZrF_4+H_2O.$$

Thus, the —OH is removed by reaction with the reactive gas. The reactive gas reacts with barium fluoride similarly.

The preform 24 is a rod, which can be hollow or solid, of fluoride glass. The core and cladding of the preform consist of two fluoride glasses with different indexes of refraction. The index of refraction can be varied by slightly changing the composition of the glass. Several possible fluoride glass compositions suitable for a preform are set out in the table below, wherein the symbol n denotes index of refraction.

CORE AND CLADDING FLUORIDE GLASS COMPOSITIONS

| Glass Composition | $ZrF_4$ | $BaF_2$ | $LaF_3$ | $AlF_3$ | LiF | $PbF_2$ | n (at .63) |
|---|---|---|---|---|---|---|---|
| mode % | | | | | | | |
| I | 53 | 19 | 5 | 3 | 20 | | 1.512 |
| II | 51.3 | 17 | 5 | 3 | 20 | 3.7 | 1.517 |
| III | 51 | 16 | 5 | 3 | 20 | 5 | 1.525 |

$HfF_4$ based glasses such as $HfF_4$—$BaF_2$—$LaF_3$ would also be suitable as preform materials.

The preform 24 can be prepared by a rotational casting process as described in "Fluorid Glass Preforms Prepared by a Rotational Casting Process," by D. C. Tran, C. F. Fisher, and G. H. Sigel, *Electronics Letters,* Jul. 22, 1982, Vol. 18 No. 15, pp. 657–658, herein incorporated by reference, and in related U.S. patent application Ser. No. 484,764, filed Apr. 14, 1983 and now U.S. Pat. No. 4,519,826.

As an alternative to the all glass preform discussed above, the preform 24 may also consist of a fluoride glass core having a polymer coating, where the coating serves as cladding.

An additional feature of the apparatus illustrated in FIG. 1 is an enclosure 25 of fused silica. The enclosure has a bottom open end which rests in grooves 26 along the top wall 12, and a top open end having an opening 27 larger than the diameter of the preform 24 through which the preform 24 descends. Side walls of the enclosure 25 completely surround a portion of the preform extending above the top wall 12. Such an enclosure 25 functions to maintain a stable temperature within the chamber 16 by preventing the flow of convection currents around the preform. In addition, opening 27 serves as an exit port for the reactive gas flowing through the apparatus.

In operation, the apparatus performs as follows to draw a fiber 23 from the preform 24. The preform 24 is caused to descend by a conventional moving means 28 as shown schematically in FIG. 1. As shown, the means 28 may be a worm screw arrangement wherein a threaded rod 29 is rotated so as to move a chuck 30 threaded onto the rod. The preform 24 is mounted to the chuck such that the preform can descend into the chamber 16 at a predetermined speed of about 1–4 mm/min, th e selected speed of descent depending upon the diameter of the preform. As the preform 24 descends into the chamber 16, the preform is heated in the heating zone to an optimum maximum temperature of about 325° C. (using a $ZrF_4$—$BaF_2$—$LaF_3$—$AlF_3$—LiF—$PbF_2$ preform) by coil 19, causing the preform to soften and flow by gravity forming the fiber 23. Once the fiber 23 emerges from the chamber 16, it is wound upon a motor-driven drum 31 which pulls the fiber 23 from the chamber at a takeup rate of about 3–7 meters/min. The diameter of the drawn fiber 23 is a function of the takeup rate.

Having described the invention in general, the following example is being given to illustrate the principles of the invention and is not intended to limit the scope of the invention in any manner. Although the use of a reactive gas is preferred, an inert gas may be circulated through the heating chamber 16 as in the following example.

Figure 2:
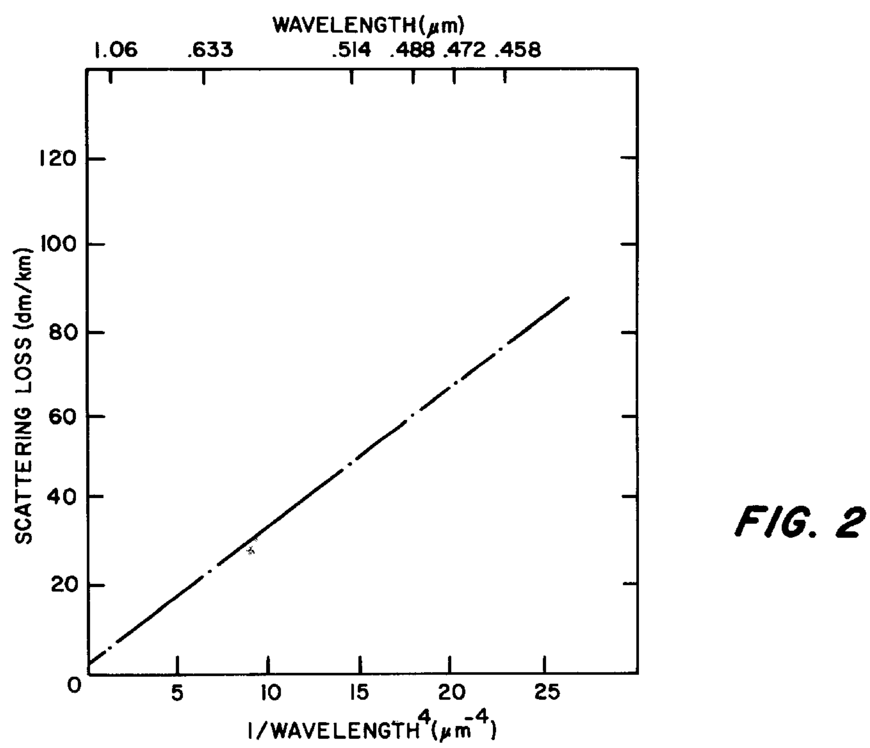
FIG. 2 is a graph showing the scattering loss of an optical fiber produced with the apparatus described herein.

A 9 mm O.D. polymer coated fluoride glass preform prepared from $ZrF_4$—$BaF_2$—$LaF_3$—$AlF_3$—LiF—$PbF_2$ was drawn into fibers using the apparatus described above. A heat zone of 7 mm was attained within the heat chamber by means of a resistance heater comprising 4 turns of Semflex 80 $N_i$–20 Cr heater cable(0.012 in diameter) operated at 5A, 80V. The furnace temperature was controlled at 325° C. with a Eurotherm 984 controller. The heat chamber was flushed continuously with argon. The preform was fed into the furnace at a rate of 2 mm per min and the fiber take-up rate was 5 m per min. The fluoride fiber thus obtained measured 315 $\mu$m in overall diameter and 8 $\mu$m in polymer coating thickness. The scattering loss of the drawn fibers is shown in FIG. 2 as a function of wavelength. The results show a $\lambda$–4 dependence of the scattering loss, implying that the scattering defects are just intrinsic density fluctuations but not crystallization or phase separation. The results also show an ultra-low fiber scattering loss of 0.019 dB/km at 4 $\mu$m.

Even lower lower losses may be obtained if a narrow heating zone (about 2 mm) is applied to the preform by means of induction heating.

Although the disclosed embodiment has shown the drawing apparatus vessel walls 12–15 as alumina, metals such as copper, brass, or aluminum are possible alternative materials, in which case the walls could be simply bolted to one another. However, alumina is preferred because of its heat insulating properties. In addition, the inner side wall 15 of vessel 11 can be gold coated silica rather than alumina.

In summary, there has been provided by the present invention an apparatus and method for drawing low loss fluoride glass fibers. Such a low loss fiber is obtained by flushing the preform 24 and fiber 23 with a reactive gas to prevent contamination of the fiber, and by providing an insulating vessel, for maintaining temperature stability within the heating chamber, and a narrow heating zone within the chamber which tends to prevent crystallization of the glass fiber.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An apparatus for drawing a fluoride glass fiber from a fluoride glassrod preform having a longitudinal axis which comprises:

an insulated vessel having a top wall, a bottom wall, side walls connected to define a chamber therein for heating said preform, an entrance opening in said top wall through which said preform enters and an exit opening in said bottom wall through which said glass fiber exits;

means within said chamber for heating a zone therein to a uniform temperature of such magnitude that said preform softens and flows when in said zone, said zone being so narrow that said fiber can be drawn from said preform without appreciable crystallization;

means in communication with said heating zone and said heating means for controlling the temperature within said zone to ±0.5° C.;

means connected to said insulated vessel at said entrance opening thereof for preventing convection currents around said preform but allowing said preform to move through said means and into said heating zone;

means for moving said preform along its longitudinal axis into said heating zone at a predetermined speed;

means for passing a stream of reactive gas around said preform and fiber so as to flush the surfaces of said preform and fiber with said reactive gas, thereby removing contaminants therefrom by chemical reaction and elimination of air; and means for pulling said fiber from said preform.

2. The apparatus as claimed in claim 1 wherein said top, bottom, and side walls of said vessel are alumina.

3. The fiber drawing apparatus as claimed in claim 1, wherein said heating means is an induction coil heater.

4. The apparatus as claimed in claim 3 wherein the heating means produces a heating zone about 2 mm long.

5. The fiber-drawing apparatus as claimed in claim 4 wherein said top, bottom, and side walls of said vessel are alumina.

6. The fiber drawing apparatus as claimed in claim 3 wherein said heating zone is about 2 mm in length.

7. The apparatus of claim 6 wherein said heating zone is produced by an induction coil.

8. The fiber-drawing apparatus as claim in claim 3 wherein said means for preventing convection currents around said preforms comprises an open-ended enclosure having a first opening larger than said entrance opening of said heating chamber and a second opening located a distance away from said first opening that is slightly larger than said preform, said enclosure being attached to said heating chamber by a seal between the edge of said first opening of said enclosure and said topwall around said entrance opening of said chamber.

* * * * *